April 9, 1935.    J. J. WILKINSON    1,997,028
COMBINATION SETTEE AND BED STRUCTURE
Filed May 21, 1934    4 Sheets-Sheet 1
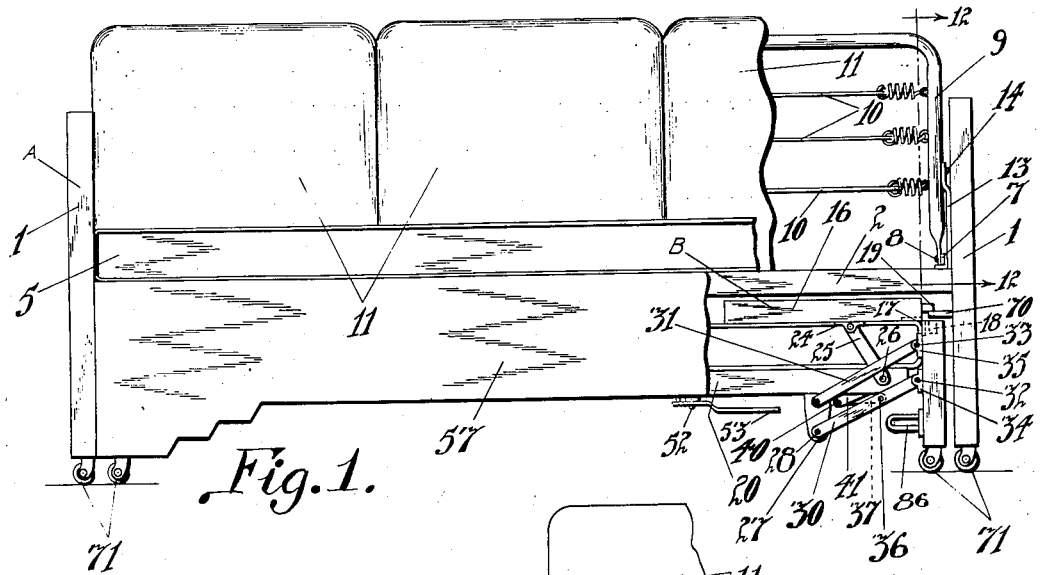
Fig. 1.
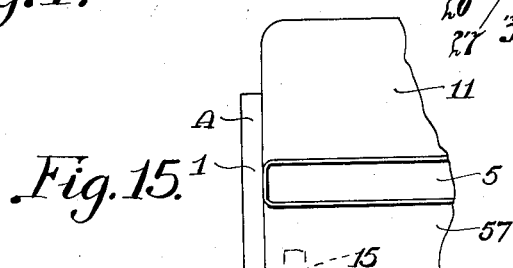
Fig. 15.
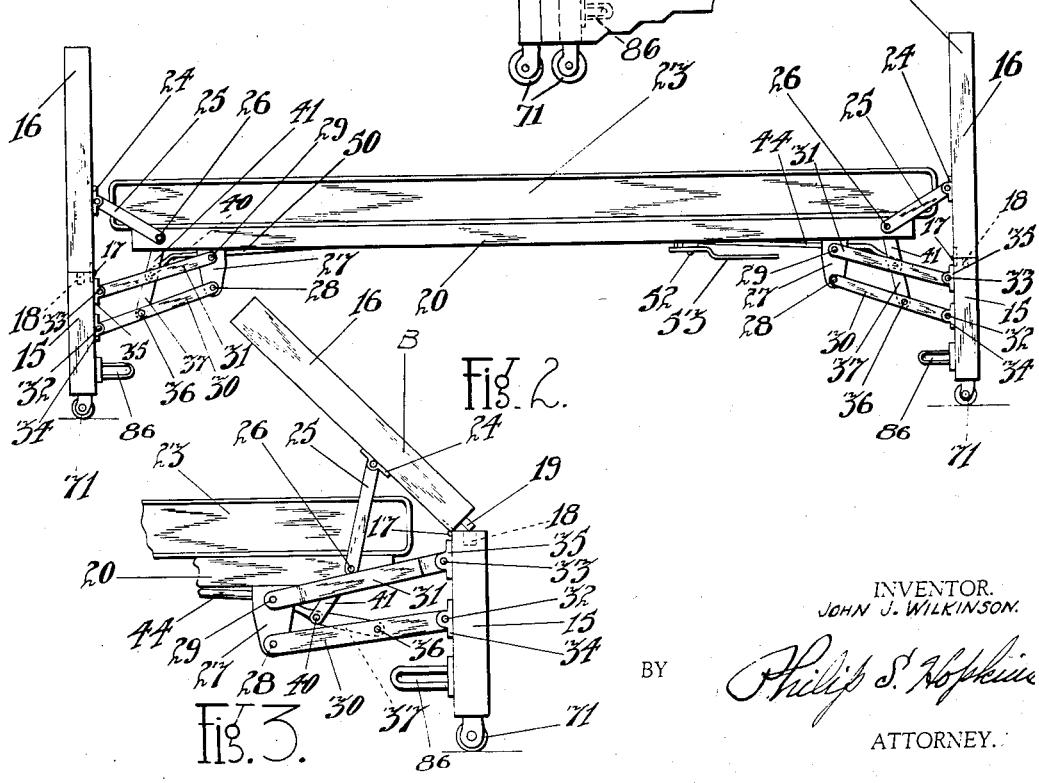
Fig. 2.
Fig. 3.
INVENTOR.
JOHN J. WILKINSON.
BY Phillip S. Hopkins
ATTORNEY.

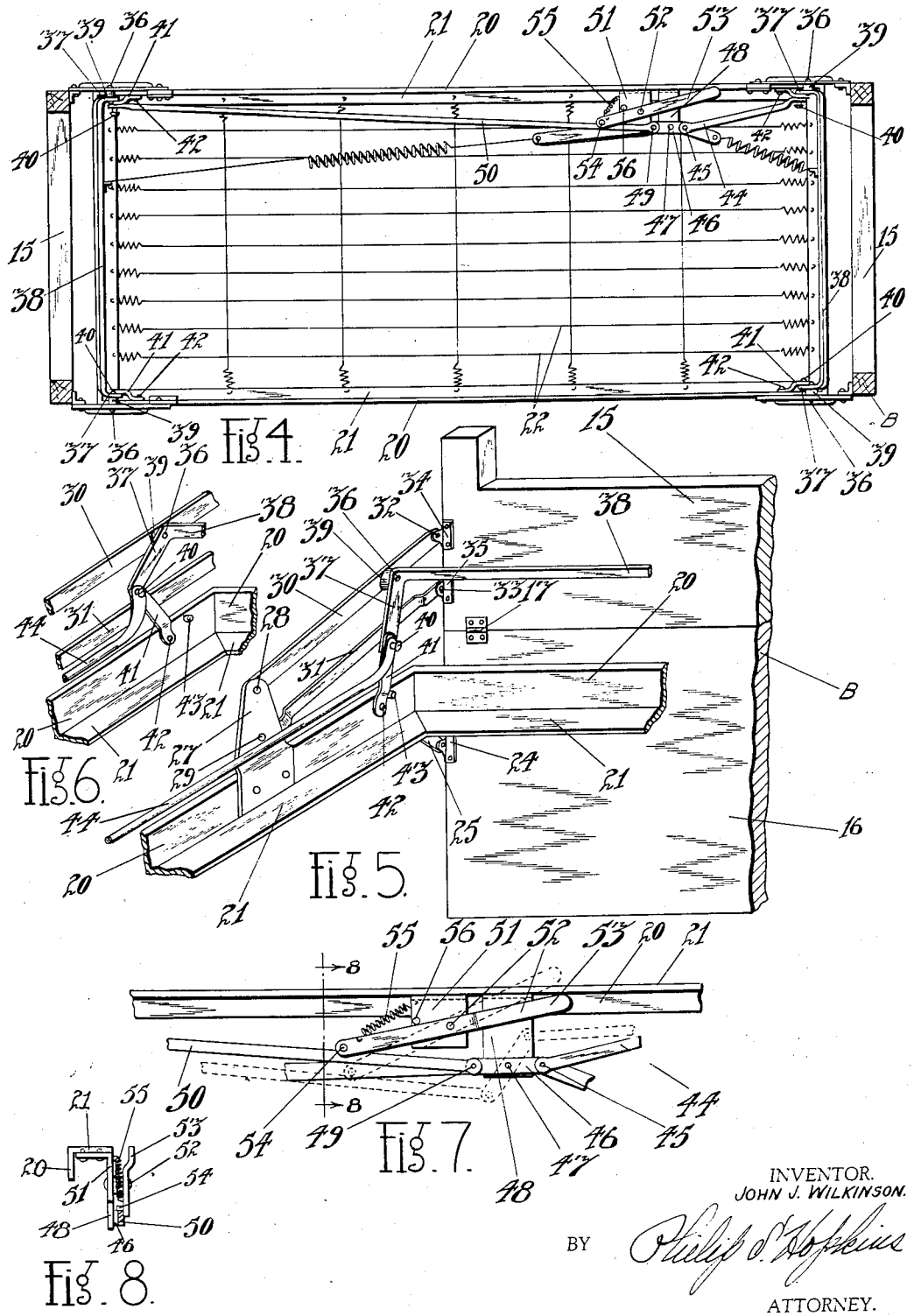
April 9, 1935. J. J. WILKINSON 1,997,028
COMBINATION SETTEE AND BED STRUCTURE
Filed May 21, 1934 4 Sheets-Sheet 2
INVENTOR.
JOHN J. WILKINSON.
BY
ATTORNEY.

April 9, 1935.   J. J. WILKINSON   1,997,028
COMBINATION SETTEE AND BED STRUCTURE
Filed May 21, 1934    4 Sheets-Sheet 3
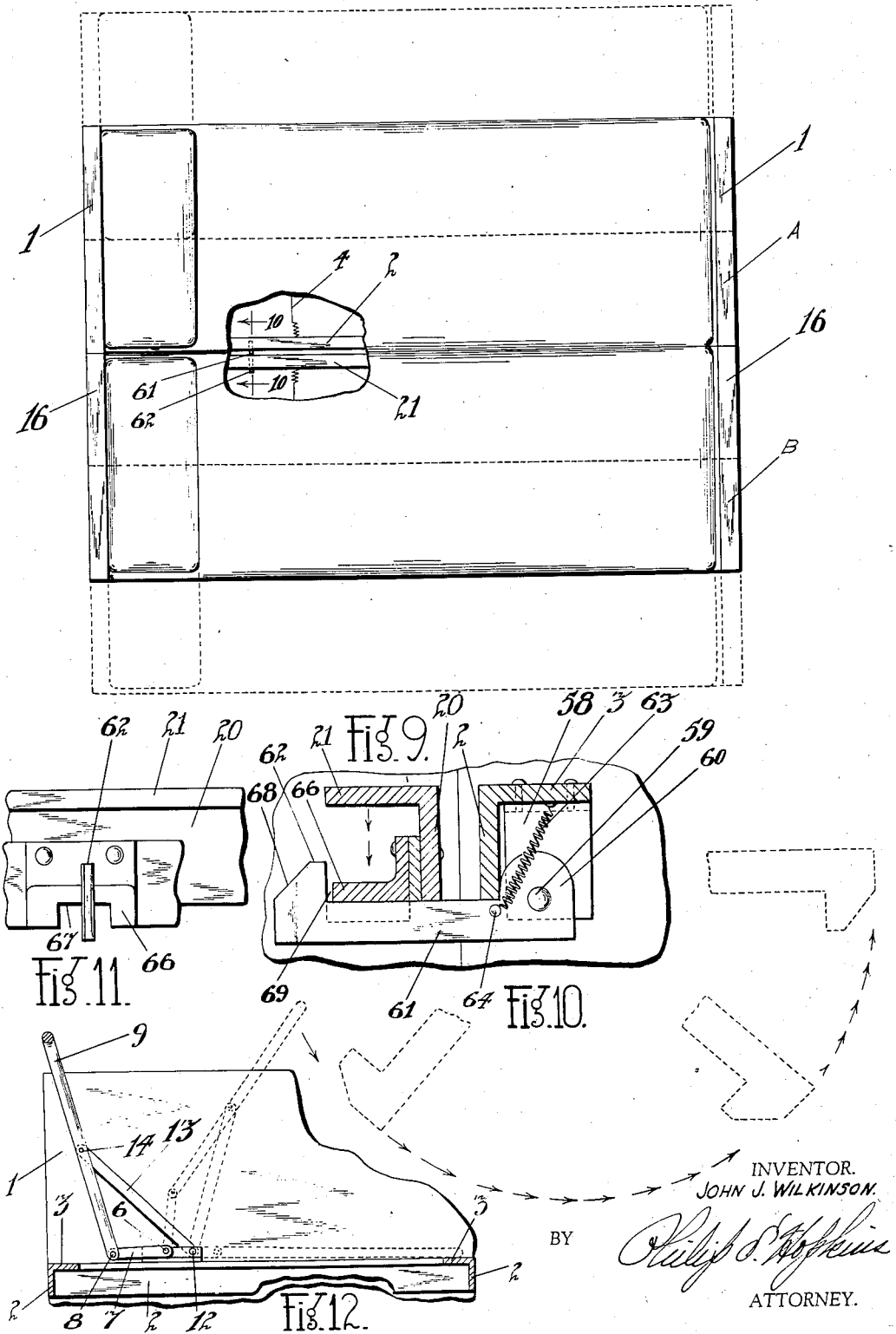
INVENTOR.
JOHN J. WILKINSON.
BY
ATTORNEY.

April 9, 1935. J. J. WILKINSON 1,997,028
COMBINATION SETTEE AND BED STRUCTURE
Filed May 21, 1934 4 Sheets-Sheet 4
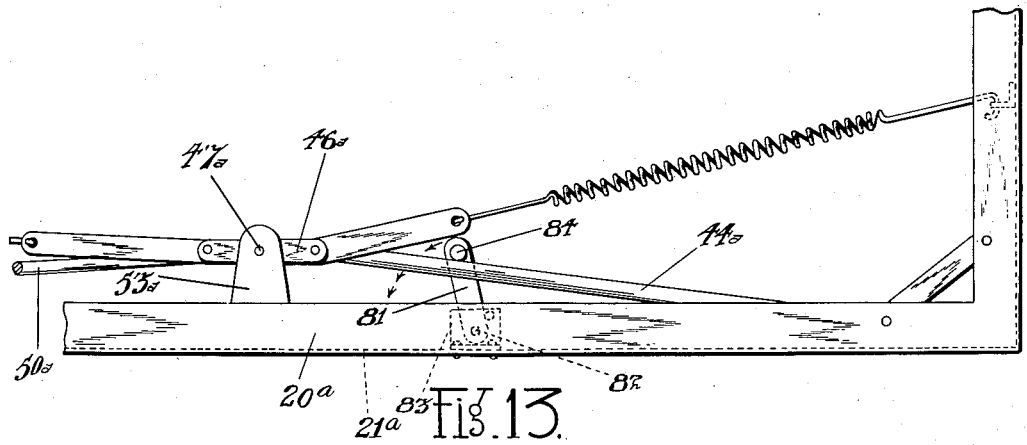
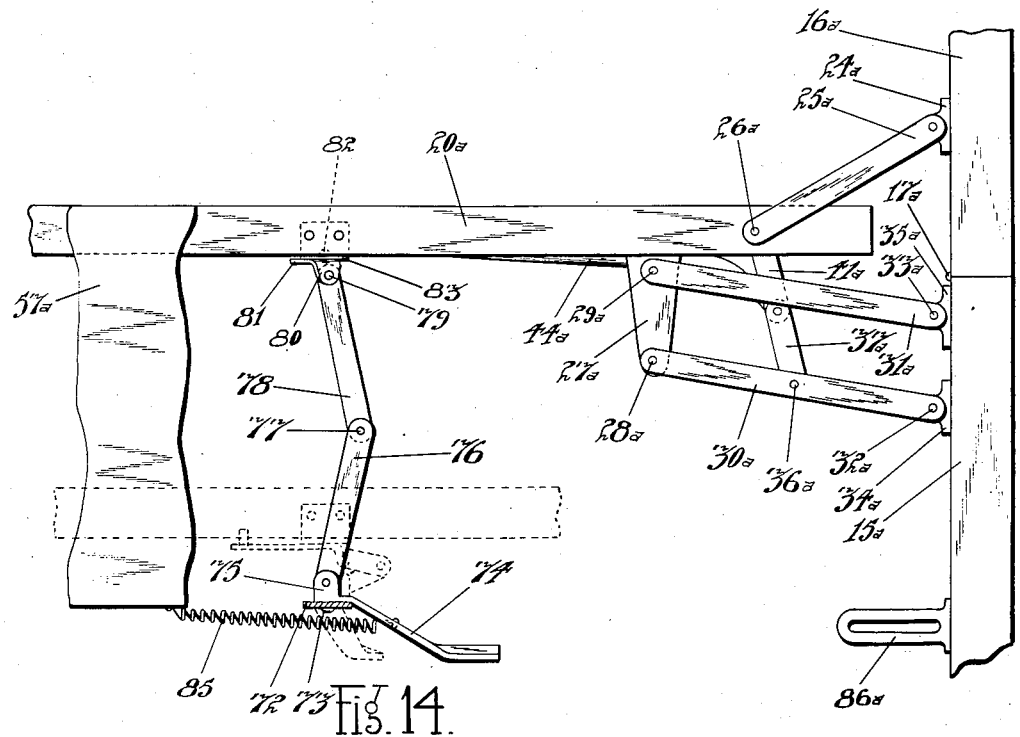
INVENTOR.
JOHN J. WILKINSON.
BY
ATTORNEY.

Patented Apr. 9, 1935

1,997,028

UNITED STATES PATENT OFFICE 1,997,028

COMBINATION SETTEE AND BED STRUCTURE

John J. Wilkinson, Owego, N. Y.

Application May 21, 1934, Serial No. 726,692

10 Claims. (Cl. 5—21)

My invention relates to a combination settee and bed structure and has for its principal object the provision of an arrangement whereby the device may be used as a settee or studio couch or the like, with seat, back and arm rests, and which can be easily and quickly converted into a single, double, or twin beds, in each instance provided with ends that form the head and foot.

Another object of my invention lies in the provision of two units, one of which is relatively fixed and the other of which is foldable for disposition beneath the fixed unit, there being certain features of cooperation between the two units to provide a novel and practical combination.

Still another object of my invention lies in the provision of a novel supporting mechanism for one unit of the invention which permits the folding and adjustment thereof whereby the same may be disposed beneath the other unit.

A further object lies in the provision of cooperating means between the folded unit and the fixed unit whereby both units may be lifted together.

A still further object lies in the provision of cooperating guide means between the two units when the auxiliary or foldable unit is placed beneath the main or fixed unit.

Another object of my invention lies in the provision of a panel carried by the foldable unit and cooperating with the other unit to obscure the folded member beneath the main unit.

Another object lies in the provision of a folding means for the end members of the auxiliary unit which simultaneously adjusts the level of the frame thereof and brings the end members toward each other to permit the same being disposed beneath the main unit.

A further and important object lies in the provision of a novel separable fastening means for securing the two units together to form a double bed, and including means for automatically releasing such securing means upon the folding operation of the foldable unit.

Another object lies in the provision of a novel and convenient releasing means for the folding mechanism.

Other objects and advantages will be apparent as the description proceeds, reference now being had to the figures of the accompanying drawings forming a part of this application and wherein like reference numerals indicate like parts.

In the drawings:

Figure 1 is a front view of the combination settee-bed, certain parts being broken away to illustrate the relation between the folding unit and the fixed unit when the device is used as a settee. This figure also illustrates the folding back member of the main unit.

Figure 2 is a side view of the foldable or auxiliary unit in unfolded ready-to-use position.

Figure 3 is a detail fragmentary view of one end of the folding unit illustrating the movable elements partially folded.

Figure 4 is a bottom plan view of the foldable unit illustrating the link connections and actuating mechanism of the folding unit.

Figure 5 is a detail perspective view of one corner of the foldable unit, showing the same in upside down position for clearness of illustration, the folding parts being shown in the fully unfolded position.

Figure 6 is a detail perspective fragmentary view illustrating a portion of the supporting links and frame in partially folded position, this view being taken of the parts in upside down position for clearness of illustration.

Figure 7 is a detail side view of the actuating means for the supporting links.

Figure 8 is a detail sectional view taken on the line 8—8 of Figure 7.

Figure 9 is a top plan view of the two units of the invention shown assembled as a double bed, certain parts being broken away for clearness and the units being shown in dotted lines in their separated or twin bed position.

Figure 10 is a sectional view taken on the line 10—10 of Figure 9.

Figure 11 is a detail side view illustrating the hook and latch securing means for the two units.

Figure 12 is a view illustrating the folding means for the back rest of the main unit, the view being taken on the line 12—12 of Figure 1.

Figure 13 is a top plan segmental view showing a modified form of a releasing mechanism.

Figure 14 is a side view of the same.

Figure 15 is a detail view illustrating the attachment of the panel to the frame.

For the purpose of clear and convenient description the two units of the invention will be referred to as the main or fixed unit A and the auxiliary or foldable unit B. The main unit A comprises the rigid spaced end members 1, between and secured to which by any suitable means as by riveting, welding, bolting or otherwise, is the frame 2. This frame 2 is preferably of angle iron construction, with the horizontal flanges 3 thereof positioned on the upper side as shown in Figure 12. Any suitable spring construction, such as resiliently mounted wires 4 (see Figure 9) extending across between the side and end portions of the frame 2 may be provided as a suitable seat or bed surface within the frame. A cushion or mattress 5 is provided on the frame 2. It will be noted that if the main unit A is to be used as a settee or couch, the end members 1 serve as arm rests at the ends of the settee whereas if the unit is used as a bed, the end members comprise the foot and head thereof.

Pivotally secured as at 6 to each of the end members 1 or to suitable brackets secured thereto, at a point adjacent the rear edge of said end members and directly adjacent the upper surface of the frame 2, is a link 7, the opposite ends of which have pivoted thereto as at 8, the ends of a U-shaped back rest frame 9, shown clearly in Figures 1 and 12. This back rest frame extends between the end members 1 and is provided with resiliently mounted wires 10 against which may be placed cushions 11 to provide a comfortable back for the main unit when used as a settee.

Also pivoted to each of the end members 1 at points 12 adjacent and in alignment with the pivots 6 is a link 13, the opposite end of which is pivoted as at 14 to the legs of the frame 9. This link arrangement provides a folding means for the back rest 9 whereby when not used as such, it may be folded downwardly and forwardly to the dotted line position shown in Figure 12 with the front edge thereof resting upon the upper horizontal flange 3 of the frame 2. In this position it will be noted that the back rest lies perfectly flat over the top of the frame 2, and thus forms a part of the supporting surface of the bed, while in its upright position it provides a reclining support for the cushions 11.

It will be understood, of course, that the same pivoted link mechanism for the back rest 9 is provided at each end thereof although that at one end only has been shown.

The auxiliary or foldable unit B also comprises end members and a frame but these elements are so arranged as to be folded and adjusted to permit the auxiliary unit to be disposed underneath the frame 2 of the main unit A when not in use. The end members of the auxiliary unit B each consists of lower sections 15 and upper sections 16 hinged thereto as at 17. The upper sections 16 are adapted to be hinged downwardly and inwardly as shown clearly in Figures 1 and 3 and as more specifically pointed out hereafter. The upper edges of the lower sections 15 are provided with recesses 18 adapted to receive pins 19 carried on the lower edges of the upper section 16 so that when the sections are moved to aligning positions as shown in Figure 2, the pins 19 will engage within the recesses 18 and serve as a reinforcing connection between these two sections.

The frame 20 of the auxiliary or foldable unit B is also preferably constructed of angle iron with supporting flanges 21. Resiliently mounted wires 22 (see Figure 4) extend from the sides and ends of the frame 20 to provide a suitable spring support surface for the mattress 23 which may be laid thereon.

Secured to the upper sections 16 of the end members and adjacent each side edge thereof are brackets 24. Pivoted at one end to each of said brackets is a link 25, the opposite end of which is pivotally secured as at 26 to the adjacent end of the frame 20, the pivots 26 being positioned on the sides of the frame 20 adjacent to the ends thereof. Thus if the upper sections 16 are folded to upright position as shown in Figure 2 and maintained in such position, the links 25 serve to support the sections 16 in raised position. The dimensions are such that when in this raised position, the frame 20 is the same distance above the floor or other supporting surface as the frame 2 of the main unit A whereby the two units may be placed side by side to form a double bed as hereinafter explained.

Suitably secured to each side of the frame 20 and adjacent each end thereof is a downwardly extending bracket 27 offset slightly outwardly as shown in Figure 5. Pivoted to each of these brackets 27, as at 28 and 29 are a pair of links 30 and 31 respectively, the opposite ends of which are pivoted as at 32 and 33 to brackets 34 and 35 respectively. These brackets 34 and 35 are suitably secured to the lower sections 15 of the end members at points adjacent each side edge thereof. Pivoted to each of the links 30 as at 36 is one leg 37 of the U-shaped yoke 38 which extends across beneath the frame 20 from one side to the other at each end. A spacer washer 39 is disposed in each instance between the link 30 and the leg 37 of the yoke whereby such yoke is spaced inwardly a short distance from the links 37. This is shown clearly in Figure 5.

The ends of the legs 37 of the yokes 38 have pivotal connection with a pintle 40 to which is also pivoted one end of a link 41, the opposite end of which is pivoted as at 42 to the inside of the frame 20, the link 41 being offset slightly to bring it inside such frame. A pin 43 secured to the frame 20 adjacent each of the links 41 limits the movement thereof in one direction, namely, in such a position that the legs 37 and the links 41 are past the center of alignment with each other.

Also pivoted to one of the pintles 40 is one end of an actuating rod 44. The opposite end of this actuating rod is pivotally connected as at 45 to one end of a link 46 pivoted at 47 to a bracket 48 secured to the frame 20 at a point spaced from the end thereof (see Figure 7). The opposite end of the link 46 has pivoted thereto as at 49 one end of a rod 50, the opposite end of which is pivoted to the pintle 40 at the opposite end of the frame and on the same side thereof, in substantial alignment with the rod 44.

Mounted upon the frame 20 directly adjacent the bracket 48 is a second bracket 51. Both of these brackets 48 and 51 are suitably secured to the vertically depending flange of the frame 2 and extend at right angles thereto inwardly and parallel with the horizontal flange 21 thereof. Pivoted as at 52 to the bracket 51 is an operating lever 53, the opposite end of which is provided with a laterally extending pin or roller 54 engaging the rod 50. A coil spring 55 is anchored at one end to the bracket 51 and at its opposite end to the operating lever 53 adjacent the end thereof carrying the pin 54. Thus the operating lever is normally held in its full line position in Figure 7 against the stop pin 56 carried by the bracket 51. In this position there is no pressure upon the rod 50 by the pin 54 on the operating handle 53.

Assuming the parts just described to be in unfolded position shown in Figures 2, 5 and 7, it will be apparent that the frame 20 is rigidly supported in its upper position by the link arrangement at each end thereof just described. The legs 37 of the yokes 38 and the links 41 pivoted to the common pintle 40 are in this position slightly past the center of alignment and the links 25, 30 and 31 thus rigidly support the frame 20 and maintain the upper sections 16 of the end members in upright position. If it is desired to fold the unit, however, the operator merely rocks the operating lever 53 on its pivot as shown in the dotted lines in Figure 7, whereupon the pin 54 pushes inwardly on the rod 50 causing the link 46 to rock on its pivot 47. This results in pulling the rods 44 and 50 towards each other or away from the end members whereupon the pintle 40 is moved past the center of alignment of the legs 37 and the links 41 in the opposite direction whereupon the upper sections 16 of the end members, assisted by the weight of the frame 20 may be hinged inwardly as shown clearly in Figures 3 and 6. This folding movement may continue until the frame 20 is lowered to the position shown in Figure 1 and with the upper sections 16 of the end members at right angles to the lower sections 15 thereof and parallel to the frame 20. It will be observed that during this folding movement the position of the links 25, 30, and 31 is materially changed as is also the position of the yokes 38. Such change of position results not only in lowering the frame 20 and the upper sections 16 but in bringing the end members towards each other. This is due to the fact that in the folded position the brackets 27 to which the links 30 and 31 are pivoted is further below the hinge point 17 of the upper and lower sections when in its lower folded position than it is above such hinge line when it is in its upper position. The result of this inward adjustment of the end members of the auxiliary unit B when in folded position is that in such position it may be disposed beneath the main unit A between the end members thereof as shown clearly in Figure 1.

It will be understood, of course, that the yokes 38 disposed at each end of the unit connect the link members on each side of the frame, thus causing them to operate in unison and simultaneously. It will also be clear that the rods 44 and 50 connect the identical link mechanisms at each end of the unit, also resulting in simultaneous and synchronous operation of the links at both ends of the unit.

When it is desired to unfold the auxiliary unit B and use it as a bed, it may be pulled outwardly from under the main unit A and by lifting upwardly on either of the upper sections 16 of the end members, it will be clear that the links 25 will raise the frame 20 and with it the brackets 27 and the links 30 and 31, until the pintles 40 reach and slightly pass the center of alignment between the legs 37 of the yokes and the links 41 on the frame. This adjustment is permitted by the pivoting of the yokes at 36 to the links 30. Obviously as the frame is raised, and with it the links 41, the legs 37 are pivoted to the right in Figure 3. The limit of this movement is just beyond "center" and is, of course, controlled by the alignment of the end sections 15 and 16. In this position, the sections 15 and 16 are in upright alignment and as before explained, the frame is placed in its upper position. This auxiliary unit may then be utilized as an independent bed or as a twin bed in conjunction with the main unit A or may be moved to edge to edge engagement with the main unit and thus provide a double bed. It will be understood, of course, that the end members of both units are the same height and form the head and foot members for the beds.

Suitably secured to the frame 20 of the auxiliary unit B on one side only thereof, as by the loops 86, to permit sliding movement of the end members toward and away from each other, is a panel 57 which may be of a decorative nature and which extends above the frame 20 to such height that when the auxiliary unit is folded, as shown in Figure 1, and is moved underneath the main unit A, the panel 57 fits between the end members 1 of the main unit and engages against the frame 2 thereof, thus completely obscuring the auxiliary unit B and its mechanism beneath the main unit A. Obviously this panel does not interfere with the operation of the unit.

Suitably secured to the inside of the frame 2 of the main unit A at one or more points along one side of such frame is a bracket 58 (see Figure 10) pivoted to which at 69 is one end 60 of a hook 61, the opposite end of which is provided with the shouldered hook portion 62. A coil spring 63 is anchored at one end to the frame 2 and at its opposite end as at 64 to the hook 61 in such relation to the pivot 59 that the spring exerts a tension on the hook to resiliently hold it either in the full line position shown in Figure 9 or in the oppositely disposed dotted line position, the spring becoming active in either position as soon as the pin 64 to which the spring is anchored on the hook passes the pivot point 59 in either direction. Normally the hook is within the frame 2, that is, in the dotted line position indicated at 65 in Figure 10.

The frame 20 of the auxiliary unit B is provided on its inner side at points corresponding with the positions of the hooks 61 on the main unit A, with brackets 66 provided with recessed latch sockets 67 adapted to receive the hook portions 62 of the hooks 61.

If it is desired to place the two units A and B together to form a double bed as shown in Figure 9, the hooks 61 are turned to the full line position of Figure 10, that is, projecting beyond the side of the frame 2. The unit B in its upright or unfolded position is then moved alongside the unit A and pushed into engagement therewith, the hook portions 62 with their beveled noses 68 sliding over the flange of the frame 20 and snapping into engagement within the latch recesses 67. The two units are thus latched together for use as a double bed.

It will be noted with reference to Figure 10 that there is some play provided at 69 between the hook portion 62 and the adjacent edge of the latch bracket 66. The purpose of this is to provide for the automatic unlatching of the two units when the foldable or auxiliary unit B is folded. In other words, this auxiliary unit B may be folded in the manner heretofore described, while it is still in latched engagement with the unit A. Obviously during such folding operation the frame 20 moves downwardly and in so doing simply pushes the hook 61 downwardly until such hook reaches a position in which the pin 64 is past the pivot 59 whereupon the spring 63 snaps the hook upwardly inside the frame 2 to its normal position, leaving the auxiliary unit B entirely free of the main unit.

With reference again to Figure 1, it will be observed that the end members 1 are provided at a point beneath the frame 2 with inwardly extending strips 70 which when the unit B is moved into position beneath the unit A, serve as a guide for the unit B, said strips lying between the pins 19 and the upper edges of the lower sections 15. Likewise these strips 70 serve as a cooperating means between the two units in this position whereby the same may be lifted together as a single unit. Obviously lifting upwardly on the main unit A causes the strips 70 to engage underneath the pins 19 and thus permit the lifting of the auxiliary unit therewith.

The end sections of both units may be provided with casters 71 whereby to render both units readily movable from place to place.

In Figures 13 and 14 I have shown a modified form of releasing means which may be substituted for that shown in Figures 4 to 8. It may be desirable to provide a foot operated releasing means for convenience, and such is the construction of this modification.

In this form, the parts 15a, 16a, 17a, 24a, 35a, 33a, 31a, 32a, 34a, 36a, 30a, 37a, 25a, 26a, 41a, 28a, 27a, 29a, 44a, 20a, 46a, 47a, 50a, 53a, 57a, and 86a, are all identical with and corresponding to the parts of the other figures bearing the same reference numerals without the modifying letter "a".

Suitably secured to the inside surface of the panel 57a is an angle bracket 72 (shown in section in Figure 14). Pivoted to the horizontal angle of this bracket, as at 73, is one end of a foot lever 74. The pivoted end of this lever is provided with an upstanding ear 75, pivoted to which is one end of a link 76, the opposite end of which is pivoted as at 77 to one end of a second link 78. The opposite end of link 78 is pivoted as at 79 to a downwardly extending end 80 of an arm 81 pivoted as at 82 to an angular bracket 83 secured to the frame flange 20a.

The free end of the arm 81 is provided with an upstanding pin or roller 84 lying adjacent the rod 44a and adapted to engage and move the same towards the frame.

It will now be clear that if the foot lever be pushed inwardly, i. e., in a direction under the bed, as shown by dotted lines in Figure 14, such arm will turn on its pivot 73 and thus turn the links 76 and 78, and consequently the arm 81. Turning the arm 81 causes the pin or roller 84 to engage and move the rod 44a towards the frame and thus cause the same folding operation of folding parts as heretofore described in connection with the rod 44 and associated elements in the other figures.

Upon the folding of the parts and the lowering of the bed frame, the links 76 and 78 hinge at their pivotal connection 77 to accommodate the lowering of the bed frame. The coil spring 85, anchored at one end to the panel 57a and at the opposite end to the lever 74 serves to normally pull said lever to the dotted line position in Figure 14 when the bed is folded.

It is believed that the operation of the device has been fully explained as the description has proceeded and that further explanation is not necessary. It will be understood, of course, that many changes may be made in details of construction and arrangement of parts without departing from the spirit and scope of my invention. I do not limit myself, therefore, to the exact form herein shown and described other than by the appended claims.

I claim:

1. In combination, two individual beds each having frame and end members, means for separably securing said beds together edge to edge to form a double bed, said means comprising a hook on one of said frames and a latch on the other of said frames for receiving said hook, one of said frames being adjustable vertically with respect to the other, and cooperating means on one of said frames for releasing said hook from said latch upon moving said adjustable frame downwardly with respect to the other frame.

2. In combination, two individual beds each having frame and end members, and means for separably securing said beds together edge to edge to form a double bed, said means comprising a hook on one of said frames and a latch on the other of said frames for receiving said hook, said hook being resiliently mounted whereby to automatically engage in locking relation with said latch when said beds are moved together, one of said frames being adjustable vertically with respect to the other, and cooperating means on said frames for releasing said hooks from said latch upon moving said adjustable frame downwardly with respect to the other frame.

3. In combination, two individual beds each having frame and end members, the frame of one of said beds being adjustable vertically with respect to the other bed frame, means for separably securing said settee beds together edge to edge to form a double bed, said means comprising a resiliently mounted hook on one frame and a latch for receiving said hook on the other frame, and means for releasing said hook from said latch upon adjusting said adjustable frame below the level of the other frame, comprising an angular extension on said latch to strike said hook and release the same from said latch upon such downward movement.

4. In combination, two individual beds, one of said beds having relatively fixed frame and end members and the other having a vertically adjustable frame and foldable end members, means for separably securing said beds together edge to edge to form a double bed, said means comprising a hook resiliently mounted on said fixed frame and a latch on said adjustable frame for receiving said hook as said beds are moved together with their frames in alignment, and means operable by the adjustment of said adjustable frame downwardly for disengaging said hook from said latch.

5. In combination, two individual beds, one of said beds having relatively fixed frame and end members and the other having a vertically adjustable frame and foldable end members, means for separably securing said beds together edge to edge to form a double bed, said means comprising a hook resiliently mounted on said fixed frame and a latch on said adjustable frame for receiving said hook as said beds are moved together with their frames in alignment, means operable by the folding of the end members and the adjustment of said adjustable frame downwardly for disengaging said hook from said latch, and means connecting said foldable ends and said adjustable frame whereby the same operate together.

6. In combination, a settee bed having fixed frame and end members, a second bed having an adjustable frame and foldable end members disposed beneath said first settee bed and removable therefrom, and a cover panel carried by the frame of said second bed for obscuring the latter from view under said first settee bed, said cover panel having adjustable connections with the end members of said second bed to permit movement of said end members upon the folding and unfolding thereof.

7. A bed comprising end members each consisting of upper and lower sections hinged directly to each other, a frame positioned between said members, link supports pivotally connecting the ends of said frame with both the upper and lower sections of said end members, said supporting links being provided on each side of said bed, and means connecting all of said links for simultaneous movement thereof.

8. A bed comprising end members each consisting of upper and lower sections hinged directly to each other, a frame positioned between said members, link supports pivotally connecting the ends of said frame with both the upper and lower sections of said end members, said supporting links being provided on each side of said bed, means connecting all of said links for simultaneous movement thereof, and a single actuating member for moving said links.

9. A bed comprising spaced end members and a frame, each of said end members consisting of upper and lower sections hinged directly to each other, supporting links pivotally connected to said frame and to said upper and lower sections whereby movement of the links to one position causes said upper sections to fold over the frame and said frame to move downwardly, and simultaneously causes said end members to move toward each other a limited distance, and connections between all of said links whereby the movement of all is simultaneous.

10. A bed comprising spaced end members and a frame, each of said end members consisting of upper and lower sections hinged directly to each other, supporting links pivotally connected to said frame and to said upper and lower sections whereby movement of the links to one position causes said upper sections to fold over the frame and the said frame to move downwardly, and simultaneously causes said end members to move toward each other a limited distance, connections between all of said links whereby the movement of all is simultaneous, and means for releasably locking said ends and frame in unfolded position.

JOHN J. WILKINSON.